US008376629B2

(12) United States Patent  
Cline et al.

(10) Patent No.: US 8,376,629 B2  
(45) Date of Patent: Feb. 19, 2013

(54) FIBER OPTIC CONNECTOR ASSEMBLY EMPLOYING FIBER MOVEMENT SUPPORT AND METHOD OF ASSEMBLY

(75) Inventors: Timothy S. Cline, Granite Falls, NC (US); Tory A. Klavuhn, Newton, NC (US); Matthew W. Smith, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/112,369

(22) Filed: May 20, 2011

(65) Prior Publication Data

US 2011/0217008 A1 Sep. 8, 2011

Related U.S. Application Data

(63) Continuation of application No. 12/286,186, filed on Sep. 29, 2008, now abandoned.

(51) Int. Cl.  
*G02B 6/36* (2006.01)

(52) U.S. Cl. ............................................. 385/78; 385/76

(58) Field of Classification Search .................... 385/76, 385/78  
See application file for complete search history.

(56) References Cited

U.S. PATENT DOCUMENTS

| 5,134,677 | A | * | 7/1992 | Leung et al. | 385/84 |
| 5,481,634 | A | * | 1/1996 | Anderson et al. | 385/76 |
| 6,017,154 | A | * | 1/2000 | Carlisle et al. | 385/86 |
| 6,196,733 | B1 | * | 3/2001 | Wild | 385/86 |
| 6,259,856 | B1 | * | 7/2001 | Shahid | 385/147 |
| 6,325,549 | B1 | * | 12/2001 | Shevchuk | 385/86 |
| 6,419,399 | B1 | * | 7/2002 | Loder et al. | 385/53 |
| 6,789,959 | B1 | * | 9/2004 | Conn | 385/94 |
| 6,962,446 | B2 | * | 11/2005 | Greub et al. | 385/80 |
| 7,150,567 | B1 | * | 12/2006 | Luther et al. | 385/78 |
| 7,758,389 | B2 | * | 7/2010 | Kadar-Kallen et al. | 439/660 |
| 7,766,556 | B2 | * | 8/2010 | Kachmar | 385/55 |
| 2001/0019654 | A1 | * | 9/2001 | Waldron et al. | 385/134 |
| 2002/0150343 | A1 | * | 10/2002 | Chiu et al. | 385/53 |
| 2002/0150353 | A1 | * | 10/2002 | Chiu et al. | 385/88 |
| 2003/0133665 | A1 | * | 7/2003 | Chiu et al. | 385/53 |
| 2004/0161207 | A1 | * | 8/2004 | Chiu et al. | 385/88 |
| 2005/0018973 | A1 | * | 1/2005 | Loder et al. | 385/53 |
| 2005/0117854 | A1 | * | 6/2005 | Chiu et al. | 385/92 |
| 2006/0093300 | A1 | * | 5/2006 | Marrs et al. | 385/134 |
| 2006/0269194 | A1 | * | 11/2006 | Luther et al. | 385/78 |
| 2007/0104425 | A1 | * | 5/2007 | Larson et al. | 385/86 |
| 2009/0191738 | A1 | * | 7/2009 | Kadar-Kallen et al. | 439/207 |
| 2010/0098381 | A1 | * | 4/2010 | Larson et al. | 385/60 |
| 2011/0058772 | A1 | * | 3/2011 | Bylander | 385/59 |

\* cited by examiner

*Primary Examiner* — K. Cyrus Kianni

(57) ABSTRACT

A fiber optic connector assembly and method employing one or more fiber movement supports. The one or more fiber movement supports are each disposed around one or more optical fibers and are configured to inhibit kinks or sharp bends from occurring in the one or more optical fibers. The fiber movement support is more rigid than an optical fiber. Thus, when a force is exerted on an optical fiber in a direction angled to the axis of the optical fiber, the force is directed to the fiber movement support. The fiber movement support translates the non-axial force in a direction toward the axis of the optical fiber. This causes the optical fiber to be pushed back towards the fiber optic cable instead of the kinking or bending the optical fiber, thus avoiding or reducing high insertion losses resulting from bending of the optical fiber.

15 Claims, 11 Drawing Sheets

FIBER OPTIC CONNECTOR ASSEMBLY EMPLOYING FIBER MOVEMENT SUPPORT AND METHOD OF ASSEMBLY

CROSS REFERENCE TO RELATED APPLICATIONS

This application is a continuation of U.S. Non-provisional application Ser. No. 12/286,186, filed Sep. 29, 2008.

BACKGROUND OF THE INVENTION

1. Field of the Invention

The present invention relates to a fiber optic connector assembly and method employing one or more fiber movement supports disposed around one or more optical fibers to inhibit sharp bending in the one or more optical fibers. The fiber movement support is more rigid than the optical fiber, so the fiber movement support translates force exerted on the optical fiber towards the axis of the optical fiber to inhibit bending.

2. Technical Background

Optical fiber is increasingly being used for a variety of applications, including but not limited to broadband voice, video, and data transmission. Benefits of optical fiber use include extremely wide bandwidth and low noise operation. With the increasing and varied use of optical fibers, it is important to provide efficient methods of interconnecting optical fibers. Fiber optic connectors have been developed for this purpose. It is important that fiber optic connectors not significantly attenuate or alter the transmitted signal. In addition, the fiber optic connector should be relatively rugged and adapted to be connected and disconnected a number of times in order to accommodate changes in the optical fiber transmission path. Because of the skill required in making optical fiber connections and the variances in applications and environments, fiber optic cables carrying one or more optical fibers are typically pre-connectorized with fiber optic connectors by the fiber optic cable manufacturer before the fiber optic cable is deployed.

Fiber optic connectors may be designed to interconnect one or more optical fibers. For example, a duplex fiber optic cable carries two optical fibers for full duplex communications. A duplex fiber optic connector is typically employed to provide a connector for the two optical fibers in a duplex fiber optic cable. An example of a duplex LC fiber optic connector 10 is illustrated in FIG. 1. The duplex LC fiber optic connector 10 provides a connector for two optical fibers (illustrated in FIG. 2) enclosed in a cable jacket 11 of a duplex fiber optic cable 12. Buffered optical fibers 42A, 42B (illustrated in FIG. 2) enclosed in the cable jacket 11 are exposed from the cable jacket 11 on an end portion. Bare optical fibers 13A, 13B contained within the buffered optical fibers are also exposed on respective end portions 15A, 15B (illustrated in FIG. 2) of the buffered optical fibers. The end portions 15A, 15B are inserted through a boot 14. The boot 14 prevents sharp bends from occurring in the duplex fiber optic cable 12 adjacent a connector housing 16 comprised of an upper housing 17 and a lower housing (illustrated as element 36 in FIG. 2). The end portions of the optical fibers exit the boot 14 and enter the connector housing 16 and are inserted into respective fiber optic connector sub-assemblies 18A, 18B supported by the connector housing 16. More specifically, the end portions of the optical fibers are inserted through respective ferrule holder passages defined by ferrule holders 20A, 20B contained inside respective connector sub-assembly housings 21A, 21B, whereby the bare portions of the optical fibers 13A, 13B extend through ferrules 24A, 24B held by the ferrule holders 20A, 20B. In the illustrated example, the fiber optic connector sub-assemblies 18A, 18B are LC fiber optic connector sub-assemblies.

An optical connection may be established with the bare optical fibers 13A, 13B of the duplex fiber optic cable 12 using one or more adapters 26. As illustrated in FIG. 1, two female-to-female LC adapters 26A, 26B are shown; one for connection to each LC connector sub-assembly housing 21A, 21B. Each LC connector sub-assembly housing 21A, 21B contains a lever 28A, 28B (illustrated in FIG. 2) that contains latches 29A, 29B configured to latch into latch orifices 30A, 30B formed in the LC adapters 26A, 26B on a first end 32A, 32B to create a secure fit between the connector sub-assembly housings 21A, 21B and the LC adapters 26A, 26B. This connection can be released by engaging the levers 28A, 28B to release the latches 29A, 29B from the latch orifices 30A, 30B. The connector housing 16 includes a latch release 34 configured to engage and release both latches 29B, 29B with one action. The LC adapters 26A, 26B each define an internal orifice (not shown) configured to receive the ferrules 24A, 24B and align them with complimentary ferrules from optical connectors connected to the opposing end of the LC adapter 26.

FIG. 2 illustrates the duplex LC fiber optic connector 10 of FIG. 1 with the upper housing 17 of the connector housing 16 removed from the lower housing 36. The upper housing 17 and lower housing 36 are molded such that a connector housing passage 38 is formed inside the connector housing 16 when the upper housing 17 and lower housing 36 are attached to each other. A portion of ferrule holders 40A, 40B and buffered optical fibers 42A, 42B from the duplex fiber optic cable 12 are disposed in the connector housing passage 38. To establish a connection between the bare optical fibers 13A, 13B and the duplex LC fiber optic connector 10, the duplex fiber optic cable 12 is inserted through the boot 14 and into a crimp body 44 retained in a crimp body recess 46 defined by the connector housing 16. The crimp body 44 secures the cable jacket 11 in the connector housing passage 38 of the connector housing 16.

The connector housing 16 is designed to separate the buffered optical fibers 42A, 42B from the duplex fiber optic cable 12 into their own individual LC fiber optic connector sub-assemblies 18A, 18B. In this regard, the two buffered optical fibers 42A, 42B, each with exposed bare optical fibers 13A, 13B on their ends, extend through the crimp body 44 and into the ferrule holders 20A, 20B. A portion of the ferrule holders 40A, 40B are retained inside the lower housing 36 in ferrule holder recesses 45A, 45B. The ferrule holders 40A, 40B illustrated in FIG. 2 include indentions 47A, 47B formed in the outer body of the ferrule holders 40A, 40B that are configured to mate with the ferrule holder recesses 45A, 45B. The ferrule holders 20A, 20B extend out from the ferrule holder recesses 45A, 45B from the connector housing 16 into the connector sub-assembly housings 21A, 21B. The upper housing 17 and the lower housing 36 are mated together via protrusions formed by and extending downward on sides of the upper housing 17 that snap fit it into recesses 43 disposed in the lower housing 36. The upper housing 17 and the lower housing 36 also contain alignment features 48 to ensure that the upper housing 17 is placed onto the lower housing 36 in the correct orientation. FIG. 2 also shows a dual adapter 26' formed by a single housing, as opposed to the individual LC adapters 26A, 26B illustrated in FIG. 1, for establishing an optical connection with the bare optical fibers 13A, 13B.

FIG. 3 illustrates the duplex fiber optic connector assembly of FIG. 2 with one of the fiber optic connector sub-assemblies 18A, 18B inserted into the individual adapter 26A illustrated in FIG. 1. A bend of about 45 degrees is present in buffered optical fiber 42A. The bend is a result of a force exerted back onto the ferrule 24A as a result of connecting adapter 24A to the optical connector sub-assembly 18A. The force exerted on the buffered optical fiber 42A as a result may have been caused by friction of the adapter 26A exerting a force on the ferrule 24A causing a spring (not shown) inside the fiber optic connector sub-assembly 18A to move back. Alternatively, the force exerted on the buffered optical fiber 42A may be caused by differences in spring force between fiber optic connector sub-assemblies mated together through the adapter 26. Bending of an optical fiber, and in particular excess bending of an optical fiber such as illustrated in FIG. 3, results in high insertion loss.

Sharp bending of optical fibers, such as in the buffered optical fiber 42A illustrated in FIG. 3, occurs because the force is exerted on an optical fiber in a direction that is not parallel or substantially parallel with the axis of the fiber optic cable. For example as illustrated in FIG. 3, because the ferrule holders 20A, 20B are aligned along longitudinal axes 49A, 49B, a force exerted by the ferrules 24A, 24A onto the buffered optical fibers 42A, 42B is also directed along the longitudinal axes 49A, 49B. However, longitudinal axes 53A, 53B of the buffered optical fibers 42A, 42B are angled at angle $\Theta_1$ with respect to the longitudinal axes 49A, 49B of the ferrule holders 20A, 20B, because the buffered optical fibers 42A, 42B come into the connector housing 16 along a longitudinal axis 50 that is offset from longitudinal axes 49A, 49B. Thus, the force is directed onto the buffered optical fibers 42A, 42B along the longitudinal axes 49A, 49B of the ferrule holders 20A, 20B and at an angle $\Theta_1$ with respect to the longitudinal axes 53A, 53B of the buffered optical fibers 42A, 42B. Thus, the force is not an axial force with respect to the buffered optical fibers 42A, 42B, because the force in not directed along or in a plane parallel to the longitudinal axes 53A, 53B of the buffered optical fibers 42A, 42B. This non-axial force causes the buffered optical fibers 42A, 42B to kink or bend instead of the force pushing the buffered optical fibers 42A, 42B towards the longitudinal axes 53A, 53B and back into the duplex fiber optic cable 12.

SUMMARY OF THE DETAILED DESCRIPTION

Embodiments of the present invention include a fiber optic connector assembly employing one or more fiber movement supports. The one or more fiber movement supports are each disposed around one or more optical fibers contained inside an optical connector housing. The one or more fiber movement supports are configured to inhibit sharp bends from occurring in the one or more optical fibers as a result of a force exerted on the one or more optical fibers in a direction angled to the axis of the one or more optical fibers. The fiber movement support is more rigid than an optical fiber. Thus, when a force is exerted on an optical fiber in a direction angled to the axis of the optical fiber supported by the fiber movement support, the force is directed to the fiber movement support. The fiber movement support translates the non-axial force in a direction towards the longitudinal axis of the optical fiber. This causes the optical fiber to be pushed back towards and/or into the fiber optic cable, thus avoiding or reducing kinking or bending of the optical fiber. In this manner, high insertion losses that can occur as a result of bending are avoided or reduced. Embodiments of the invention also include a method of assembling a fiber optic connector assembly employing a fiber movement support.

In one embodiment, one or more optical fibers from a fiber optic cable are exposed on an end portion and are inserted into a rear end of a fiber optic connector housing. The exposed optic fiber includes a bare portion of optical fiber. The end portion of the optical fiber is inserted into a dedicated fiber movement support, which is inserted into a ferrule holder passage defined by a ferrule holder of a fiber optic connector sub-assembly. The end portion of the optical fiber extends through the fiber movement support, into the ferrule holder passage, and through a ferrule held by the ferrule holder in the fiber optic connector sub-assembly. The ferrule holder extends through a front end of the connector housing with the bare optical fiber exposed through the ferrule of the fiber optic connector sub-assembly. The longitudinal axis of the ferrule holder passage is offset from the longitudinal axis of the fiber optic cable and thus is angled with respect to the axis of the optical fiber. Thus, if a force is exerted onto the ferrule and back onto the optical fiber contained therein, the force is exerted in a direction that is angled to the axis of the optical fiber and thus not an axial force with respect to the optical fiber. This is because the longitudinal axis of the ferrule holder passage is angled to the axis of the optical fiber contained therein. However, the fiber movement support translates the non-axial force in a direction toward the axis of the optical fiber to direct or push the optical fiber back into the fiber optic cable thus avoiding or reducing kinking or bending of the optical fiber.

The fiber optic connector housing employing a fiber movement support according to the present invention may support any number of optical fibers. In one embodiment, the fiber optic connector is a duplex fiber optic connector for connecting to a duplex fiber optic cable containing two buffered optical fibers therein. Two distinct fiber optic connector sub-assemblies, each with fiber movement supports inserted into the ferrule holder passages therein, are supported by the duplex fiber optic connector. The fiber optic connector sub-assemblies may be aligned along longitudinal axes that are offset from the longitudinal axis of the rear end of the duplex fiber optic connector housing, such that force exerted on the buffered optical fibers is angled to the axis of the buffered optical fibers.

The fiber movement support may be provided in any form or structure so long as it is capable of translating force exerted on an optical fiber disposed therein. In one embodiment, the fiber movement support is provided in the form of one or more stiffener tubes, wherein one or more optical fibers supported by the fiber optic connector are inserted into the one or more stiffener tubes. In another embodiment, the fiber movement support is provided in the form of one or more channels molded into a fiber optic connector housing wherein one or more optical fibers are disposed inside the one or more channels. In yet another embodiment, the fiber movement support is provided in the form of an insert with one or more insert channels contained therein. The insert is inserted inside and supported by the fiber optic connector housing. The one or more optical fibers are inserted or placed into the one or more channels in the insert.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
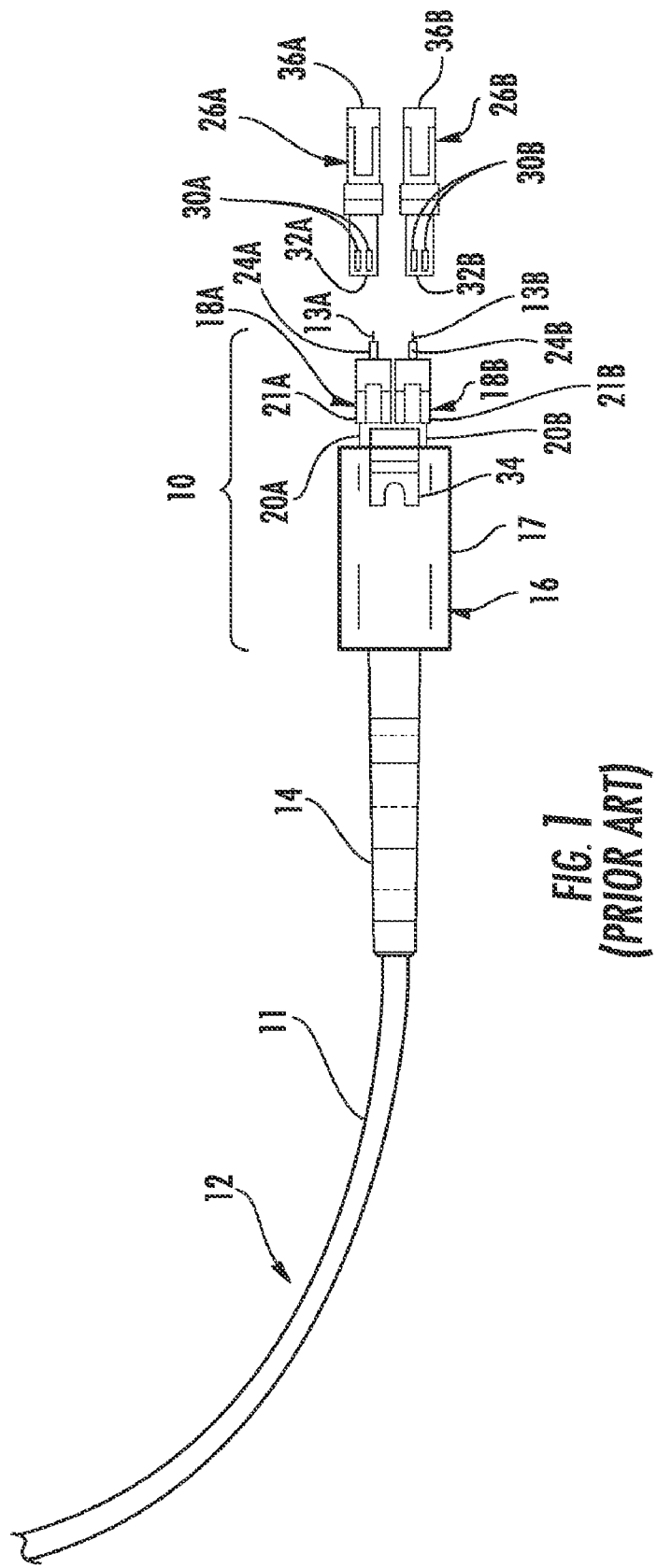
FIG. 1 is a view of a prior art duplex fiber optic cable, connector, and adapter.

Reference will now be made in detail to the preferred embodiments of the present invention, examples of which are illustrated in the accompanying drawings. Whenever possible, like reference numbers will be used to refer to like components or parts.

Embodiments of the present invention include a fiber optic connector assembly employing one or more fiber movement supports. The one or more fiber movement supports are each disposed around one or more optical fibers contained inside an optical connector housing. The one or more fiber movement supports are configured to inhibit sharp bends from occurring in the one or more optical fibers as a result of a force exerted on the one or more optical fibers in a direction angled to the axis of the one or more optical fibers. The fiber movement support is more rigid than an optical fiber. Thus, when a force is exerted on an optical fiber in a direction angled to the axis of the optical fiber supported by the fiber movement support, the force is directed to the fiber movement support. The fiber movement support translates the non-axial force in a direction towards the longitudinal axis of the optical fiber. This causes the optical fiber to be pushed back towards and/or into the fiber optic cable, thus avoiding or reducing kinking or bending of the optical fiber. In this manner, high insertion losses that can occur as a result of bending are avoided or reduced. Embodiments of the invention also include a method of assembling a fiber optic connector assembly employing a fiber movement support.

In one embodiment, one or more optical fibers from a fiber optic cable are exposed on an end portion and are inserted into a rear end of a fiber optic connector housing. The exposed optic fiber includes a bare portion of optical fiber. The end portion of the optical fiber is inserted into a dedicated fiber movement support, which is inserted into a ferrule holder passage defined by a ferrule holder of a fiber optic connector sub-assembly. The end portion of the optical fiber extends through the fiber movement support, into the ferrule holder passage, and through a ferrule held by the ferrule holder in the fiber optic connector sub-assembly. The ferrule holder extends through a front end of the connector housing with the bare optical fiber exposed through the ferrule of the fiber optic connector sub-assembly. The longitudinal axis of the ferrule holder passage is offset from the longitudinal axis of the fiber optic cable and thus is angled with respect to the axis of the optical fiber. Thus, if a force is exerted onto the ferrule and back onto the optical fiber contained therein, the force is exerted in a direction that is angled to the axis of the optical fiber and thus not an axial force with respect to the optical fiber. This is because the longitudinal axis of the ferrule holder passage is angled to the axis of the optical fiber contained therein. However, the fiber movement support translates the non-axial force in a direction toward the axis of the optical fiber to direct or push the optical fiber back into the fiber optic cable thus avoiding or reducing kinking or bending of the optical fiber.

Figure 2:
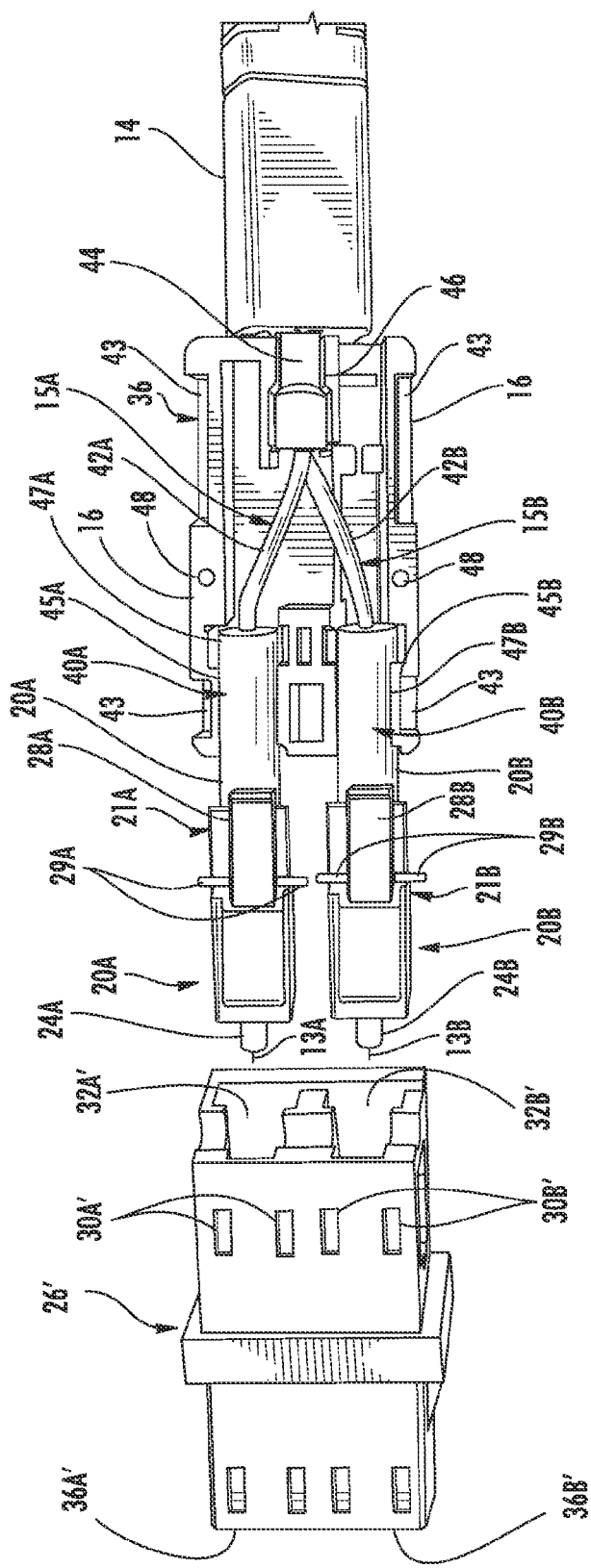
FIG. 2 is a top view of the duplex fiber optic connector of FIG. 1 showing the optical fibers inside an exposed fiber optic connector housing and inserted into fiber optic connector sub-assemblies of a fiber optic connector.
Figure 3:
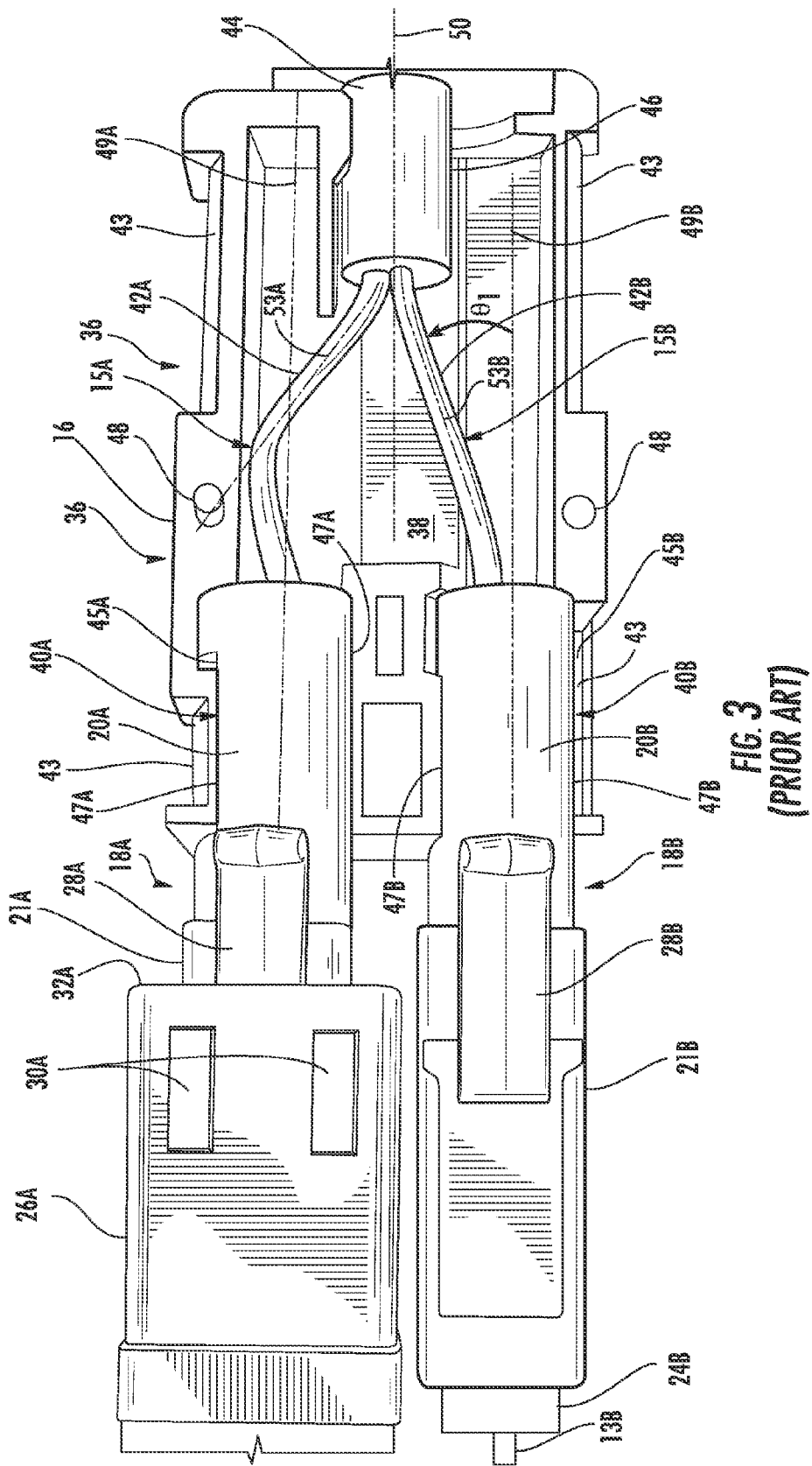
FIG. 3 is a close-up top cross section view of the connector housing and fiber optic connector sub-assemblies of FIG. 2 showing an excess bend in an optical fiber caused by the force exerted by the adapter on the ferrule when connected.
Figure 4:
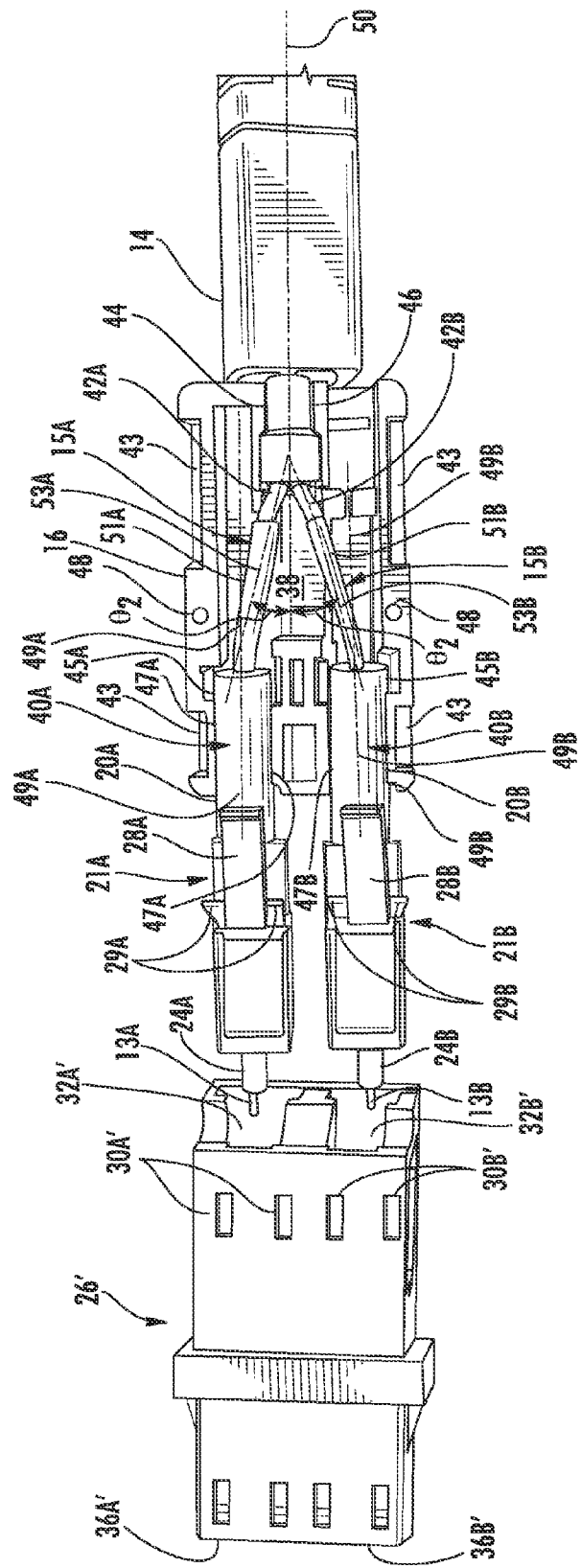
FIG. 4 is a top view of an unconnected fiber optic connector employing stiffener tubes as fiber movement supports for optical fibers disposed in a fiber optic connector housing and inserted into fiber optic connector sub-assemblies of a fiber optic connector, according to one embodiment of the invention.

FIG. 4 illustrates an exemplary embodiment of the present invention employing a duplex LC fiber optic connector 10. Many of the features of the duplex LC fiber optic connector 10 illustrated in FIG. 4 (as indicated by the common numeric labeling of components) are common to those illustrated in FIGS. 1-3 previously discussed. Thus, these common features will not be repeated. However, the duplex LC fiber optic connector 10 employs two fiber movement supports, one for each buffered optical fiber 42A, 42B of the duplex fiber optic cable 12 in the form of stiffener tubes 51A, 51B. In this embodiment, the stiffener tubes 51A, 51B are cut lengths of tubing with the buffered optical fibers 42A, 42B inserted therein, typically before placement or insertion of the buffered optical fibers 42A, 42B inside the connector housing 16.

In this disclosed embodiment, the stiffener tubes 51A, 51B are each disposed at angle $\Theta_2$ with respect to the longitudinal axis 50 of the duplex fiber optic cable 12, because the buffered optical fibers 42A, 42B are disposed within the connector housing 16 at angle $\Theta_2$ with respect to the longitudinal axis 50 when inserted into the ferrule holders 20A, 20B. In this embodiment, the angle $\Theta_2$ is an acute angle of about 15 degrees. This angle is due to the offset between the longitudinal axes 49A, 49B of the ferrule holders 20A, 20B and longitudinal axis 50 of the buffered optical fibers 42A, 42B coming into the connector housing 16. This offset is about 3.2 millimeters (mm) in this embodiment. The offset may be at least 2.0 millimeters (mm) in other embodiments. This offset between the longitudinal axes 49A, 49B of the ferrule holders 20A, 20B and longitudinal axis 50 of the buffered optical fibers 42A, 42B causes force exerted back on the buffered optical fibers 42A, 42B to push the buffered optical fibers 42A, 42B along the longitudinal axes 49A, 49B of the ferrule holders 20A, 20B and not along the longitudinal axes 53A, 53B of the buffered optical fibers 42A, 42B toward the duplex fiber optic cable 12. The force exerted onto the buffered optical fibers 42A, 42B is a non-axial force due to this offset. Thus, the buffered optical fibers 42A, 42B can kink and/or bend as a result if a fiber movement support is not employed. When the stiffener tubes 51A, 51B are employed, force exerted on the buffered optical fibers 42A, 42B causes the buffered optical fibers 42A, 42B to contact the inner wall (not shown) of the stiffener tubes 51A, 51B. Because the stiffener tubes 51A, 51B are constructed out of a more rigid material than the buffered optical fibers 42A, 42B, the stiffener tubes 51A, 51B translate this non-axial force into an axial force in a direction towards the longitudinal axes 53A, 53B of the buffered optical fibers 42A, 42B. Thus, the buffered optical fibers 42A, 42B are pushed back toward and inside the duplex fiber optic cable 12, thus preventing or reducing bending in the buffered optical fibers 42A, 42B.

If any bending does occurs, it is more gradual because of the stiffener tubes 51A, 51B. Sharp bending of the buffered optical fibers 42A, 42B, like that illustrated in FIG. 3 for example, is inhibited. When it is stated that a force is translated towards the longitudinal axis of an optical fiber, this means that the direction force, initially a force directed generally along the longitudinal axes 49A, 49B of the ferrule holders 20A, 20B (and thus non-axial with respect to the buffered optical fibers 42A, 42B) is changed in direction by some angle greater than zero towards the longitudinal axes 53A, 53B of the buffered optical fibers 42A, 42B. The force may be translated such that the initially non-axial force is translated into an axial or substantially axial force with respect to the buffered optical fibers 42A, 42B. The change in direction towards the longitudinal axes 49A, 49B of the buffered optical fibers 42A, 42B may cause the force to be directed in alignment or substantial alignment with the longitudinal axes 49A, 49B of the buffered optical fibers 42A, 42B, although such is not required by the present invention. In this embodiment, the stiffener tubes 51A, 51B translate the direction of the force at about an angle of 15 degrees towards the longitudinal axes of the buffered optical fibers 42A, 42B, although the present invention is not limited to a particular translation angle.

Figure 5:
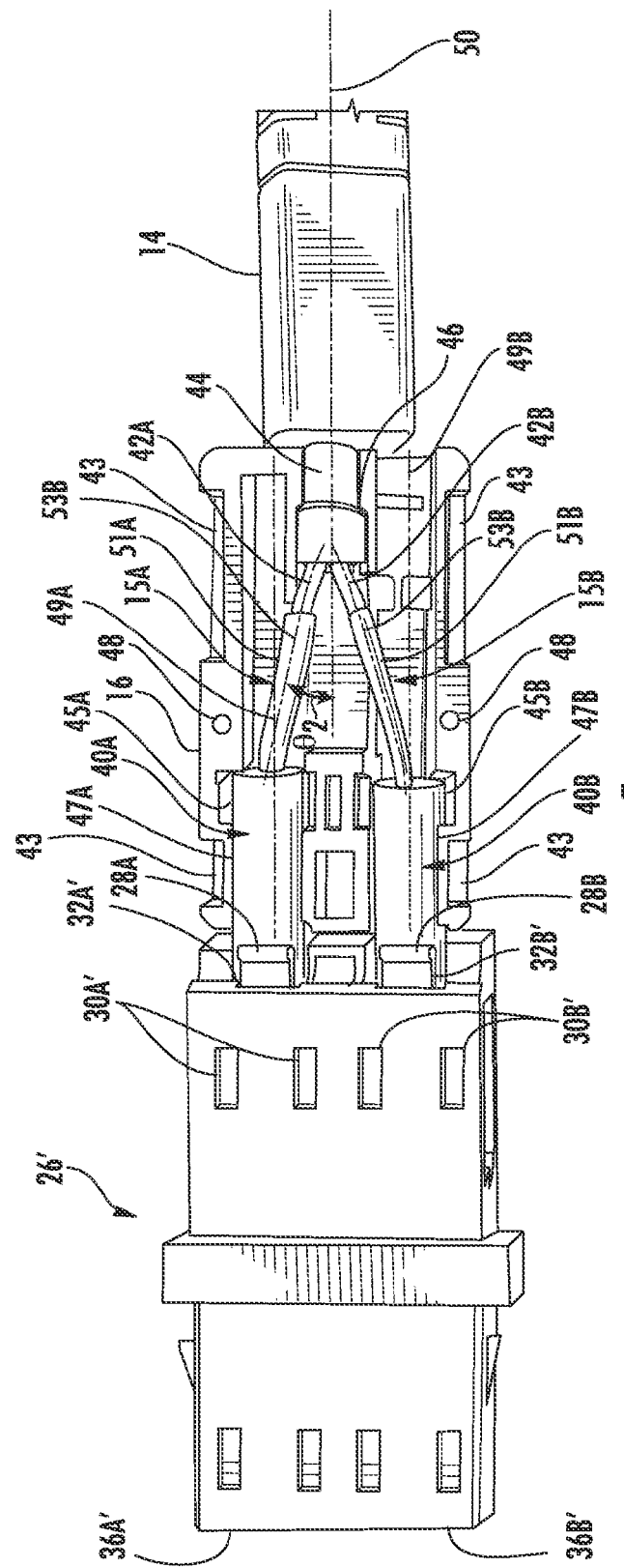
FIG. 5 is the fiber optic connector of FIG. 4 connected to an adapter, wherein the stiffener tubes disperse force exerted by the adapter against the ferrules of the fiber optic connector sub-assemblies.

FIG. 5 illustrates the same duplex LC fiber optic connector 10 of FIG. 4, but the connector sub-assembly housings 21A, 21B and the ferrules 24A, 24B have been inserted and connected inside the dual LC adapter 26'. In this embodiment, a single body, dual LC adapter 26' is employed as opposed to individual, single adapters 26 as illustrated in FIG. 4. As previously discussed, insertion of the connector sub-assembly housings 21A, 21B and the ferrules 24A, 24B, into the adapter 26' can be one cause of excess force being exerted back onto the buffered optical fibers 42A, 42B disposed in the connector housing 16. As illustrated, the buffered optical fibers 42A, 42B do not suffer from sharp bending like that illustrated in FIG. 3, because stiffener tube 51A translates the force towards the longitudinal axis 53A of the buffered optical fiber 42A. Minimal bending may be defined as a small bend radius the connector housing 16 geometry requires at an angle between about 0 to 25 degrees. For example, the sharpest angle of bending in the buffered optical fibers 42A, 42B disposed in the connector housing 16 of FIG. 5 is about 15 degrees. The stiffener tubes 51A, 51B are translating the exerted force over a greater length of the buffered optical fibers 42A, 42B.

The buffered optical fibers 42A, 42B may be tight buffered optical fibers, meaning that the buffer tube disposed around the bare optical fibers 13A, 13B is tightly bound around the optical fibers 13A, 13B. For example, the buffered tube may be constructed out of a thermoplastic material, or a fluropolymer such as Tetrafluoroethylene (TFE), Polytetrafluorethylene (PTFE), Polyvinylidene Fluoride (PVDF), and PolyVinyl Chloride (PVC), as examples. The stiffener tubes 51A, 51B are typically selected such that their inner diameter is slightly larger than the outer diameter of the buffered optical fibers 42A, 42B. For example, the outer diameter of the buffered optical fibers 42A, 42B may be about 900 micrometers (μm). The inner diameter of the stiffener tubes 51A, 51B may be about 1000 micrometers (μm) when designed to support the buffered optical fibers 42A, 42B. However, the stiffener tubes may be between about 300 and 1000 micrometers (μm) for other embodiments, especially if the stiffener tube is designed to support buffered optical fibers of less outer diameter and/or bare optical fibers.

The stiffener tubes 51A, 51B may be constructed out of any material that is more rigid that the buffered optical fibers 42A, 42B and rigid enough to translate force exerted onto the buffered optical fibers 42A, 42B. In this manner, the stiffener tubes 51A, 51B do not kink or bend as easily as the buffered optical fibers 42A, 42B, and as a result translate the non-axial force exerted onto the buffered optical fibers 42A, 42B. For example, the range of forces not parallel to the axis of the buffered optical fibers 42A, 42B that may be exerted on the buffered optical fibers 42A, 42B may be between about 0 Newtons (N) and 5 Newtons (N). Examples of materials that can be used to construct the stiffener tubes 51A, 51B include a high density Polyethylene (HPDE), or a fluropolymer, such as TFE, PTFE, PVDF, and PVC, as examples. The stiffener tubes 51A, 51B may also be constructed out of a Teflon®-based material, which contains a PTFE. The stiffener tubes 51A, 51B may be constructed out of any material desired as long as the stiffener tubes 51A, 51B disperse force exerted on optical fibers.

The stiffener tubes 51A, 51B are typically placed overtop the buffered optical fibers 42A, 42B before placement or insertion into the connector housing 16. However, the stiffener tubes 51A, 51B may be disposed in the connector housing 16 before the buffered optical fibers 42A, 42B are inserted into the connector housing 16. Further, the stiffener tubes 51A, 51B may be disposed on both or only one of the buffered optical fibers 42A, 42B. For example, the construction of an LC optical connector sub-assembly 18 may be such that only one optical fiber bends sharply and in an undesired manner in response to a force exerted by the ferrule onto the optical fiber. One ferrule holder may be offset or offset more from the longitudinal axis of optical fibers coming into the connector housing 16 than another ferrule holder. Also, the stiffener tubes 51A, 51B may be employed with other types of optical fibers that do not include buffering and/or are not coated.

The present invention also includes embodiments involving a method of assembling a fiber optic connector assembly employing one or more fiber movement supports. These methods and steps that may be employed as part of a method of assembling a fiber optic connector assembly employing one or more fiber movement supports in the form of stiffener tubes 51A, 51B, such as inserted into the LC fiber optic connector sub-assemblies 18A, 18B illustrated in FIGS. 4 and 5. However, these steps and methods may be employed for any fiber optic connector employing at least one fiber movement support to support any type of optical fiber, whether buffered, coated, disposed within any other type of structure or support, or not.

In a preferred embodiment, the process begins by first cutting stiffener tubes 51A, 51B to a desired length, such as from a stiffener tube roll. The length of the stiffener tubes 51A, 51B is pre-selected such that the stiffener tubes 51A, 51B can be inserted into a ferrule holder passage, such as ferrule holder passage 56A illustrated in FIG. 6. Although only one fiber optic connector sub-assembly 18A is illustrated, this step may also be performed for the other fiber optic connector sub-assemblies, including, for example, connector sub-assembly 18B for the duplex LC fiber optic connector 10. The length of the stiffener tubes 51A, 51B are selected so that they extend out from the ferrule holder passages 56A, 56B disposed inside the ferrule holders 20A, 20B in a sufficient length to support insertion of the buffered optical fibers 42A, 42B through the stiffener tubes 51A, 51B and inside the ferrule holders 20A, 20B.

Figure 6:
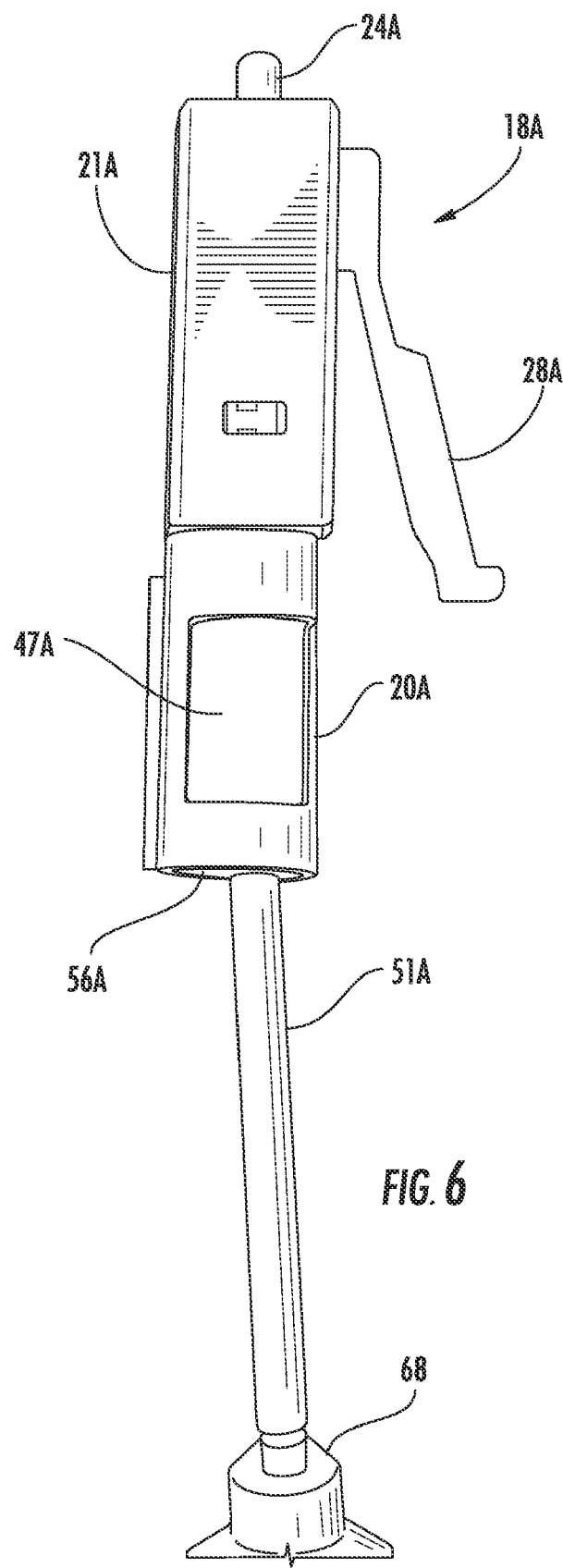
FIG. 6 is a fiber optic connector sub-assembly with a stiffener tube inserted into the ferrule holder passage of the ferrule holder prior to insertion of an optical fiber into the fiber movement support and ferrule holder passage, according to one embodiment of the invention.
Figure 7:
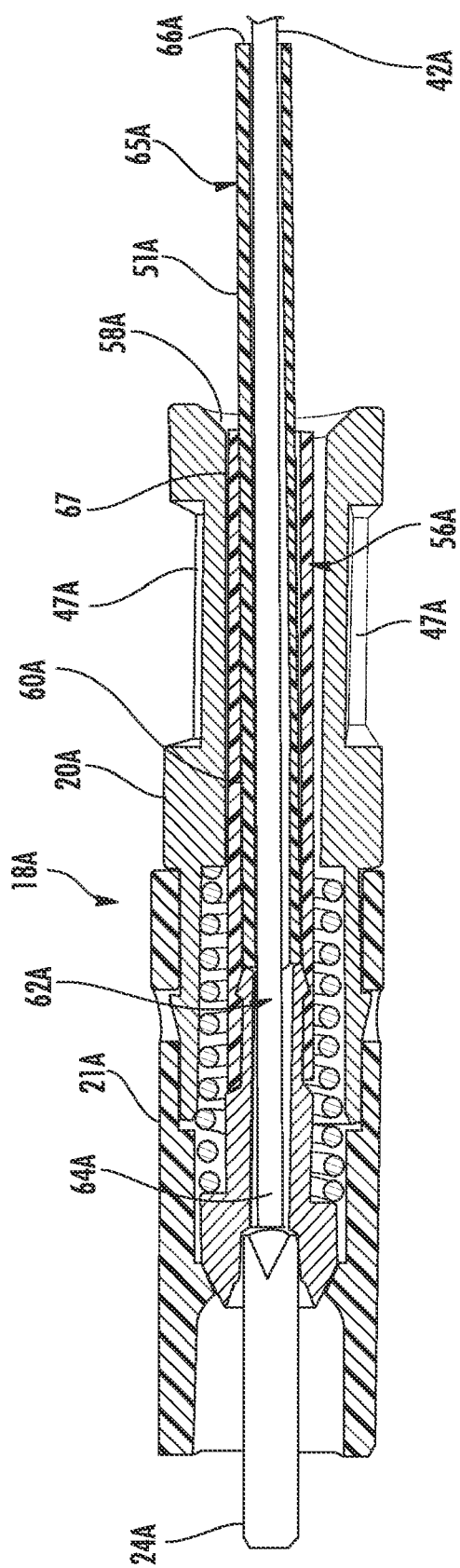
FIG. 7 is a top cross section view of the fiber optic connector sub-assembly of FIG. 6.

Thereafter, the stiffener tubes 51A, 51B are inserted into the ferrule holder passages as illustrated by stiffener tube 51A inserted into the ferrule holder passage 56A of the connector sub-assembly 18A in FIGS. 6 and 7. The stiffener tubes 51A, 51B may be inserted by hand or machine. It may be desirable or convenient to insert the stiffener tubes 51A, 51B into the ferrule holders 20A, 20B before the ferrule holders 20A, 20B are inserted or placed into the connector housing 16. The stiffener tube 51A, 51B may be used as a guide for inserting the buffered optical fibers 42A, 42B into the ferrule holder passages 56A, 56B. Further, an insertion device 68, such as a syringe for example, may be employed to assist in the insertion of the stiffener tubes 51A, 51B into the ferrule holder passages 56A, 56B. The insertion device 68 would ideally have an outer diameter that is less than the inner diameter of the stiffener tubes 51A, 51B, and rigid enough to support insertion of the stiffener tubes 51A, 51B into the ferrule holder passages 56A, 56B. This is illustrated by example in FIG. 6, wherein the stiffener tube 51A inserted into the ferrule holder passage 56A of the ferrule holder 20A. Further, if the fiber optic connector supports a connector to more than two optical fibers, the step of inserting the stiffener tube into the ferrule holder passage is performed for all fiber optic connector sub-assemblies that employ a fiber movement support.

FIG. 7 is a top cross section view of the fiber optic connector sub-assembly 18A of FIG. 6 showing the insertion of the stiffener tube 51A into the ferrule holder passage 56A of the ferrule holder 20A. As illustrated, the stiffener tube 51A is inserted through a ferrule holder opening 58A defined by the ferrule holder 20A creating the ferrule holder passage 56A therein. The stiffener tube 51A is typically inserted fully into the ferrule holder passage 56A until a first end 60A of the stiffener tube 51A abuts against a ferrule bore opening 62A leading into a ferrule bore 64A for receiving the bare optical fiber 13A exposed on the end portion 15A of the buffered optical fiber 42A. The outer diameter of the stiffener tube 51A is larger than the inner diameter of the ferrule bore opening 62A. Due to the length of the stiffener tube 51A, a portion 65A of the stiffener tube 51A extends outside the ferrule holder passage 56A terminating at a second end 66A of the stiffener tube 51A. This second end 66A of the stiffener tube 51A receives the bare optical fiber 13A.

Figure 8:
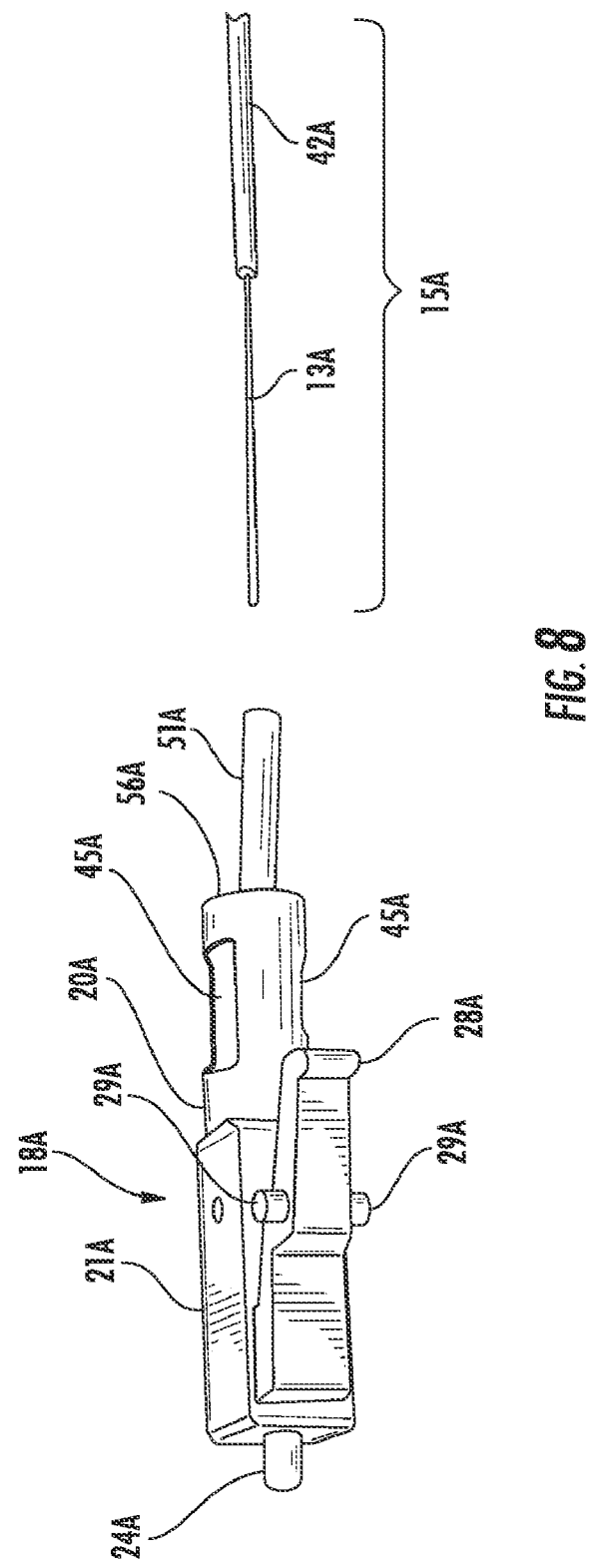
FIG. 8 is the fiber optic connector sub-assembly of FIGS. 6 and 7, showing how an optical fiber is inserted into the stiffener tube and into the ferrule holder passage of the fiber optic connector sub-assembly, according to one embodiment of the invention.

The next step in this preferred embodiment is to strip the end portions 15A, 15B of the cable jacket 11 of the duplex fiber optic cable 12 to the desired or necessary lengths to expose the buffered optical fibers 42A, 42B and the bare optical fibers 13A, 13B disposed therein for insertion into the connector housing 16 and fiber optic connector sub-assemblies 18A, 18B. This is illustrated in FIG. 8 for one of the fiber optic connector sub-assemblies 18A, but is equally applicable for any other fiber optic connector sub-assemblies supported by a connector housing, including connector sub-assembly 18B. The bare optical fibers 13A, 13B should be exposed a length sufficient to extend through the ferrules 24A, 24B when inserted into their respective stiffener tubes 51A, 51B and through the ferrule bore 64A. For example, ten millimeters (mm) of the bare optical fibers 13A, 13B may be exposed. Thereafter, the end portions 15A, 15B of the duplex fiber optic cable 12 with the exposed buffered optical fibers 42A, 42B and bare optical fibers 13A, 13B extending therefrom are inserted through the boot 14, through the crimp body 44, and into their respective stiffener tubes 51A, 51B and through the ferrules 24A, 24B. The bare optical fibers 13A, 13B are inserted through the ferrule bores 64A, 64B until the bare optical fibers 13A, 13B extend through the ferrules 24A, 24B, wherein the bare optical fibers 13A, 13B can be cleaved and polished. The fiber optic connector sub-assemblies 18A, 18B, and more specifically the indentions 47A, 47B formed by the ferrule holders 20A, 20B are inserted into the ferrule holder recesses 45A, 45B molded into the lower housing 36 of the connector housing 16. Thereafter, the upper housing 17 of the connector housing 16 is inserted on top of the lower housing 36 to secure the connector housing 16 and the buffered optical fibers 42A, 42B split into respective ferrule holders 20A, 20B therein.

Thus far, the stiffener tubes 51A, 51B have been described as one form of fiber movement supports that may be used for the present invention. However, any supporting device or structure may be used as a fiber movement support so long as the device or structure supports an optical fiber and is able to translate a force exerted on an optical fiber toward the axis of the optical fiber. In this regard, FIGS. 9-11 illustrate alternative embodiments of fiber movement supports and fiber optic connectors that may also be used for the been invention and provide support that the present invention is not limited to any particular type of fiber movement support or structure.

Figure 9:
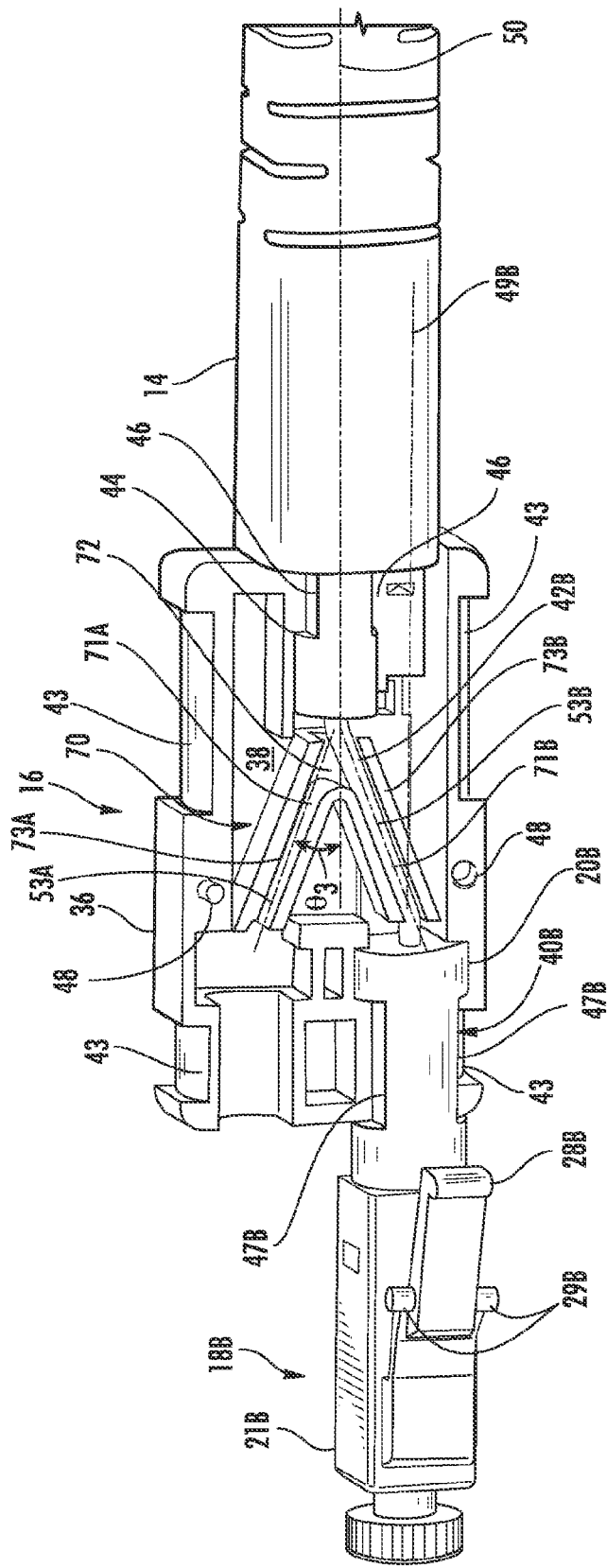
FIG. 9 is a top view of a fiber optic connector employing fiber movement support in the form of an insert inserted into a fiber optic connector housing of a fiber optic connector defining channels for supporting optical fibers inserted therein, according to an alternative embodiment of the invention.

FIG. 9 illustrates another embodiment of the present invention. FIG. 9 illustrates a top view of the duplex LC fiber optic connector 10 of FIGS. 4 and 5; however, the fiber movement support is not provided in the form of a stiffener tube 51. Instead, the fiber movement support is provided in the form of an insert 70 providing one or more insert channels 71 disposed therein. In this embodiment, two insert channels 71A, 71B are provided in the insert 70 since the connector housing 16 supports the duplex fiber optic cable 12. The insert channels 71A, 71B form a V-shape, where each insert channel 71A, 71B separates at an acute angle $\Theta_3$ with respect to the longitudinal axis 50 of the fiber optic cable (not shown) and a common insert channel portion 72 that receives the buffered optical fibers 42A, 42B. The insert channels 71A, 71B direct the buffered optical fibers 42A, 42B to their respective ferrule holders 20A, 20B. Similar to the stiffener tubes 51A, 51B, the insert channels 71A, 71B support the buffered optical fibers 42A, 42B and translate force exerted onto the buffered optical fibers 42A, 42B in a direction towards the axes 53A, 53B of the buffered optical fibers 42A, 42B. The force exerted on the buffered optical fiber 42B illustrated in FIG. 9 is directed to an inner wall 73B of the molded channel, which then translates the force to inhibit sharp bending in the buffered optical fiber 42B. Note that any number of insert channels 71 may be present in the insert 70 to accommodate any number of optical fibers to provide fiber movement supports for the optical fibers.

In this embodiment, the insert 70 is placed into the lower housing 36 of the connector housing 16. The insert 70 may be constructed out of the same material as the connector housing 16, but this is not necessarily required. The buffered optical fibers 42A, 42B, only one of which is shown in FIG. 9 (42B), are placed inside the insert channels 71A, 71B during assembly. The buffered optical fibers 42A, 42B may be placed inside the insert channels 71A, 71B after the insert 70 is placed inside the lower housing 36, however, it may be easier to place the buffered optical fibers 42A, 42B inside the insert channels 71A, 71B before the insert 70 is placed inside the lower housing 36. Although not shown, the upper housing 17 may also contain a complementary insert so that the insert channels 71A, 71B in both the lower housing 36 and the upper housing 17 either completely or substantially envelop the buffered optical fibers 42A, 42B. However, providing an insert 70 in either the upper housing 17 or the lower housing 36 is possible so long as the buffered optical fibers 42A, 42B are supported therein.

Figure 10:
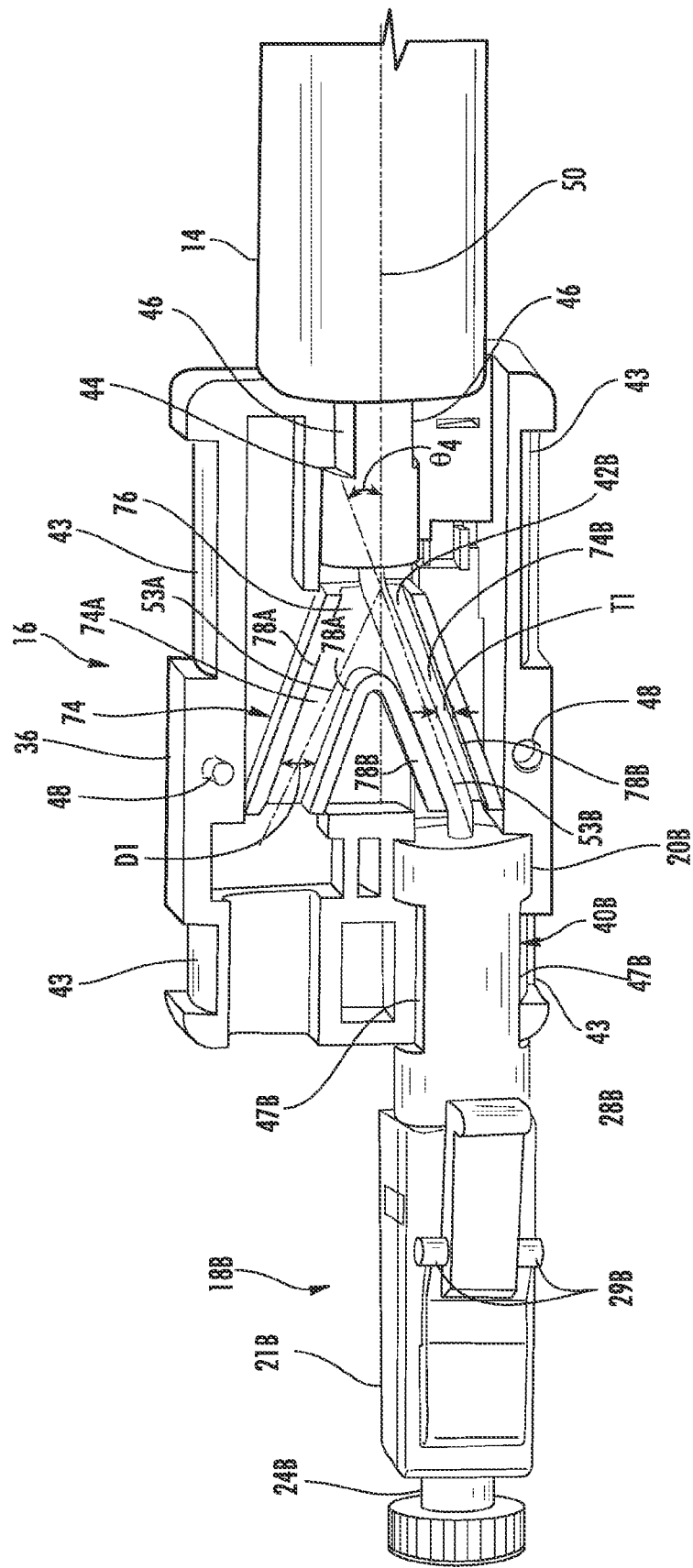
FIG. 10 is a top view of a fiber optic connector employing fiber movement supports in the form of channels molded into a fiber optic connector housing of a fiber optic connector for supporting optical fibers inserted therein, according to another alternative embodiment of the invention.
Figure 11:
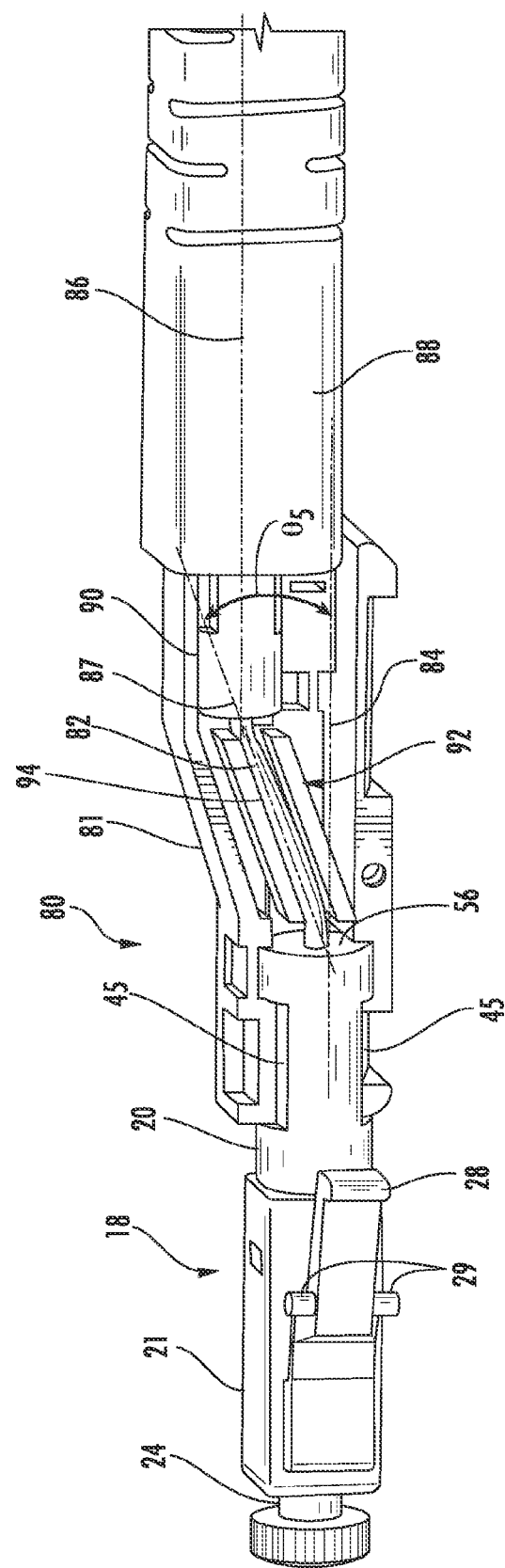
FIG. 11 is a top view of fiber optic connectors employing a single fiber movement support for a single optical fiber disposed in a single fiber optic connector housing, according to alternative embodiments of the invention.

FIG. 10 illustrates another embodiment of the present invention. FIG. 10 illustrates a top view of the duplex LC fiber optic connector 10 of FIGS. 4 and 5; however, the fiber movement support is not provided in the form of a stiffener tube 51. Instead, the fiber movement support is provided in the form of one or molded channels 74 molded into the connector housing 16. In this embodiment, two molded channels 74A, 74B are provided since the connector housing 16 supports the duplex fiber optic cable 12. The molded channels 74A, 74B form a V-shape, where each molded channel 74A, 74B separates at an acute angle $\Theta_4$ with respect to the longitudinal axis 50 of the fiber optic cable (not shown) and a common molded channel portion 76 that receives the buffered optical fibers 42A, 42B. The molded channels 74A, 74B direct the buffered optical fibers 42A, 42B to their respective ferrule holders 20A, 20B. Only one buffered optical fiber 42B is illustrated for convenience, but the molded channel 74A may be employed to support the other buffered optical fiber 42A as well. Similar to the stiffener tubes 51A, 51B, the molded channels 74A, 74B supports the buffered optical fibers 42A, 42B and translate force exerted onto the buffered optical fibers 42A, 42B. As illustrated in FIG. 10 for the example of the buffered optical fiber 42B, the force exerted on the buffered optical fiber 42B is directed to an inner wall 78B of the molded channel 74B, which then translates the force towards the longitudinal axis 53B to inhibit sharp bending in the buffered optical fiber 42B. Note that any number of molded channels 74 may be present to accommodate any number of optical fibers to provide fiber movement supports for the optical fibers.

In this embodiment, the molded channels 74A, 74B are molded into the lower housing 36 of the connector housing 16. The molded channels 74A, 74B are typically formed out of the same material as the connector housing 16, but do not necessarily have to be. The buffered optical fibers 42A, 42B, only one of which is shown in FIG. 10 (42B), are placed inside the molded channels 74A, 74B during assembly. Although not shown, the upper housing 17 may also contain complementary molded channels so that the molded channels 74 in both the lower housing 36 and the upper housing 17 either completely or substantially envelop the buffered optical fibers 42A, 42B placed inside the channels. However, providing molded channels is only required for this embodiment in either the upper housing 17 or the lower housing 36 so long as the buffered optical fibers 42A, 42B are supported therein.

Further, because the fiber movement support in this embodiment is molded into a permanent positioning in the connector housing 16, it may be desirable to design the molded channels 74A, 74B such that there is a tolerance left between the outside diameter of buffered optical fibers 42A, 42B and the inner walls 78A, 78B. This allows easier insertion of the buffered optical fibers 42A, 42B into the molded channels 74A, 74B since the buffered optical fibers 42A, 42B cannot be placed in the fiber movement supports before the fiber movement supports are placed or inserted into the connector housing 16, like was possible with the stiffener tubes 51A, 51B of FIGS. 3-8. For example, the molded channels 74A, 74B may be designed to have an inner width of distance D1, which may be about 2.0 millimeters (mm) to allow for a tolerance T1 of between about 0.5 and 1.0 millimeters (mm). However, the tolerance should be small enough that kinking or sharp bending in the buffered optical fibers 42A, 42B does not occur before the force is translated. It may also be desirable to provide a surface finish in the molded channels 74A, 74B so that the buffered optical fibers 42A, 42B can slide easily back to the duplex fiber optic cable 12 during translation.

FIG. 11 illustrates yet another alternative embodiment of a fiber optic connector employing a fiber movement support. In FIG. 11, a single fiber optic connector 80 is provided that employs a connector housing 81 only supporting one buffered optical fiber 82. Although a fiber movement support, such as those illustrated in embodiments herein, may be more particularly useful for multiple fiber optic cables, a fiber movement support may also be employed with single fiber optic cables as well if a force can be exerted onto a single fiber optic cable in a direction angled to the axis of the single fiber optic cable. For example, as illustrated in FIG. 11, if the connector housing 81 is designed to support a ferrule holder 20 of an optical connector sub-assembly 18 that has a longitudinal axis 84 offset from a longitudinal axis 86 of the buffered optical fiber 82, such as illustrated in FIG. 11, force exerted onto the buffered optical fiber 82 will be directed at an angle $\Theta_5$ with respect to the longitudinal axis 87 of the buffered optical fiber 82.

The fiber movement support is provided in the form of an insert 88 having an insert channel 92 to support the buffered optical fiber 82 inserted therein in a similar manner as the insert 70 of FIG. 10. The buffered optical fiber 82 is placed inside the insert channel 92 wherein the buffered optical fiber 82 will contact an inner wall 94 of the insert channel 92 defined by the insert 88 when a force is exerted onto the buffered optical fiber 82. The insert channel 92 will translate force towards the longitudinal axis 86 of the buffered optical fiber 82. Thus, bending of the buffered optical fiber 82 is inhibited thereby avoiding or reducing high insertion losses that can be caused by sharp bending of an optical fiber.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic LC connector assembly comprising:
   a duplex fiber optic cable comprising a first buffered optical fiber and a second buffered optical fiber;
   a first and a second ferrule;
   a first ferrule holder that holds the first ferrule, wherein the first buffered optical fiber is inserted through the first ferrule holder;
   a second ferrule holder that holds the second ferrule, wherein the second buffered optical fiber is inserted through the second ferrule holder;
   an LC connector housing, wherein the optical fiber is inserted into the housing along a first longitudinal axis, and wherein the housing comprises a first ferrule holder recess that secures the first ferrule holder within the housing along a second longitudinal axis and a second ferrule holder recess that secures the second ferrule holder along a third longitudinal axis;
   a first stiffener tube within the housing, the first buffered optical fiber extends outwardly from the first ferrule holder and through the first stiffener tube, and wherein the first stiffener tube comprises a material that is more rigid than the first buffered optical fiber;
   a second stiffener tube within the housing, the second buffered optical fiber extends outwardly from the second ferrule holder and through the second stiffener tube, and wherein the second stiffener tube comprises a material that is more rigid than the second buffered optical fiber; and
   a crimp body that receives the first buffered optical fiber extending from the first stiffener tube and the second buffered optical fiber extending from the second stiffener tube, wherein the first and second stiffener tubes terminate at a location spaced from the crimp body.

2. The fiber optic assembly of claim 1, wherein the distance of offset between the first longitudinal axis and the second longitudinal axis is at least about 2.0 millimeters and the distance of offset between the first longitudinal axis and the third longitudinal axis is at least about 2.0 millimeters.

3. The fiber optic assembly of claim 1, wherein the first stiffener tube is constructed from a material comprised of the group consisting of a thermo-plastic material, a fluropolymer, Tetrafluoroethylene (TFE), Polytetrafluroethylene (PTFE), Polyvinylidene Fluroide (PFDE) and a Teflon®-based material.

4. The fiber optic assembly of claim 1, wherein the first stiffener tube has an inner diameter of between about 300 and 1000 micrometers (μm).

5. The fiber optic assembly of claim 1, wherein the distance between the first longitudinal axis and the second longitudinal axis defines a first offset and the first stiffener tube is disposed at an acute offset angle of about 15 degrees with respect to the first longitudinal axis.

6. The fiber optic assembly of claim 1, wherein the first stiffener tube is received within a first ferrule holder passage within the first ferrule holder.

7. A fiber optic LC connector assembly comprising:
   a duplex fiber optic cable comprising a first buffered optical fiber and a second buffered optical fiber;
   a first and a second ferrule;
   a first ferrule holder that holds the first ferrule, wherein the first buffered optical fiber is inserted through the first ferrule holder;
   a second ferrule holder that holds the second ferrule, wherein the second buffered optical fiber is inserted through the second ferrule holder;
   an LC connector housing, wherein the optical fiber is inserted into the housing along a first longitudinal axis, and wherein the housing comprises a first ferrule holder recess that secures the first ferrule holder within the housing along a second longitudinal axis and a second ferrule holder recess that secures the second ferrule holder along a third longitudinal axis;
   a boot adjacent the LC connector housing;
   a first stiffener tube within the LC connector housing that terminates at a location spaced from the boot, the first buffered optical fiber extending through the first stiffener tube, and wherein the first stiffener tube comprises a material that is more rigid than the first buffered optical fiber; and
   a second stiffener tube within the LC connector housing that terminates at a location spaced from the boot, the second buffered optical fiber extending through the second stiffener tube, and wherein the second stiffener tube comprises a material that is more rigid than the second buffered optical fiber;
   wherein the first stiffener tube is received within a first ferrule holder passage within the first ferrule holder and the first stiffener tube extends outwardly beyond the first ferrule holder passage.

8. The fiber optic assembly of claim 7 further comprising a crimp body that receives the first buffered optical fiber extending from the first stiffener tube and the second buffered optical fiber extending from the second stiffener tube.

9. The fiber optic assembly of claim 8, wherein the first and second stiffener tubes terminate at a location spaced from the crimp body.

10. The fiber optic assembly of claim 7, wherein the second stiffener tube is received within a second ferrule passage within the second ferrule holder.

11. The fiber optic assembly of claim 7, wherein the distance of offset between the first longitudinal axis and the second longitudinal axis is at least about 2.0 millimeters and the distance of offset between the first longitudinal axis and the third longitudinal axis is at least about 2.0 millimeters.

12. The fiber optic assembly of claim 7, wherein the first stiffener tube is constructed from a material comprised of the group consisting of a thermo-plastic material, a fluropolymer, Tetrafluoroethylene (TFE), Polytetrafluroethylene (PTFE), Polyvinylidene Fluroide (PFDE) and a Teflon®-based material.

13. The fiber optic assembly of claim 7, wherein the first stiffener tube has an inner diameter of between about 300 and 1000 micrometers (μm).

14. The fiber optic assembly of claim 7, wherein the distance between the first longitudinal axis and the second longitudinal axis defines a first offset and the first stiffener tube is disposed at an acute offset angle of about 15 degrees with respect to the first longitudinal axis.

15. The fiber optic assembly of claim 6, wherein the first stiffener tube extends outwardly beyond the first ferrule holder passage.

* * * * *